United States Patent
Koeberl et al.

(10) Patent No.: US 8,938,792 B2
(45) Date of Patent: Jan. 20, 2015

(54) DEVICE AUTHENTICATION USING A PHYSICALLY UNCLONABLE FUNCTIONS BASED KEY GENERATION SYSTEM

(71) Applicant: Intel Corporation, Santa Clara, CA (US)

(72) Inventors: Patrick Koeberl, Alsbach-Hahnlein (DE); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 13/730,469

(22) Filed: Dec. 28, 2012

(65) Prior Publication Data

US 2014/0189890 A1    Jul. 3, 2014

(51) Int. Cl.
  *G06F 21/00*  (2013.01)
  *G06F 21/70*  (2013.01)

(52) U.S. Cl.
  CPC ..................... *G06F 21/70* (2013.01)
  USPC .............................. 726/10; 713/175; 713/176

(58) Field of Classification Search
  CPC . H04L 9/3278; H04L 9/0866; H04L 63/0823; H04L 9/3263; G06F 21/73; G06F 2221/2129
  USPC .................. 726/2, 10, 34; 713/173, 175, 176
  See application file for complete search history.

(56) References Cited

U.S. PATENT DOCUMENTS

| | | | |
|---|---|---|---|
| 6,823,454 B1 * | 11/2004 | Hind et al. ............. | 713/168 |
| 7,310,821 B2 | 12/2007 | Lee et al. | |
| 7,681,103 B2 | 3/2010 | Devadas et al. | |
| 7,757,083 B2 | 7/2010 | Devadas et al. | |
| 7,761,714 B2 | 7/2010 | Luzzi et al. | |
| 7,813,507 B2 | 10/2010 | Brickell et al. | |

(Continued)

FOREIGN PATENT DOCUMENTS

| | | |
|---|---|---|
| WO | WO 2013/101085 A1 | 7/2013 |
| WO | WO 2014/051741 A2 | 4/2014 |
| WO | WO 2014/105310 A1 | 7/2014 |

OTHER PUBLICATIONS

"GS1 DataMatrix an Introduction and Technical Overview of the Most Advanced GS1 Identifiers Compliant Symbology," copyright 2011, retrieved on Dec. 9, 2012 from http://www.gs1.org/docs/barcodes/GS1_DataMatrix_Introduction_and_technical_overview.pdf, 39 pages.

(Continued)

*Primary Examiner* — Joseph P Hirl
*Assistant Examiner* — John B King
(74) *Attorney, Agent, or Firm* — Patent Capital Group

(57) ABSTRACT

At least one machine accessible medium having instructions stored thereon for authenticating a hardware device is provided. When executed by a processor, the instructions cause the processor to receive two or more device keys from a physically unclonable function (PUF) on the hardware device, generate a device identifier from the two or more device keys, obtain a device certificate from the hardware device, perform a verification of the device identifier, and provide a result of the device identifier verification. In a more specific embodiment, the instructions cause the processor to perform a verification of a digital signature in the device certificate and to provide a result of the digital signature verification. The hardware device may be rejected if at least one of the device identifier verification and the digital signature verification fails.

24 Claims, 5 Drawing Sheets

(56) References Cited

U.S. PATENT DOCUMENTS

| | | | |
|---|---|---|---|
| 7,818,569 | B2 | 10/2010 | Devadas et al. |
| 7,840,803 | B2 | 11/2010 | Clarke et al. |
| 7,904,731 | B2 | 3/2011 | Devadas et al. |
| 8,290,150 | B2 | 10/2012 | Erhart et al. |
| 8,386,801 | B2 | 2/2013 | Devadas et al. |
| 8,386,990 | B1* | 2/2013 | Trimberger et al. ......... 716/136 |
| 8,402,401 | B2 | 3/2013 | Chakraborty et al. |
| 8,525,549 | B1 | 9/2013 | Feng et al. |
| 2002/0129261 | A1 | 9/2002 | Cromer et al. |
| 2007/0183194 | A1 | 8/2007 | Devadas et al. |
| 2008/0256600 | A1 | 10/2008 | Schrijen et al. |
| 2008/0279373 | A1 | 11/2008 | Erhart et al. |
| 2009/0006862 | A1 | 1/2009 | Alkove et al. |
| 2009/0080659 | A1 | 3/2009 | Elder et al. |
| 2009/0083833 | A1* | 3/2009 | Ziola et al. ......... 726/2 |
| 2010/0085075 | A1 | 4/2010 | Luzzi et al. |
| 2010/0122353 | A1 | 5/2010 | Koushanfar et al. |
| 2010/0127822 | A1 | 5/2010 | Devadas |
| 2010/0199103 | A1 | 8/2010 | Van Rijnswou |
| 2010/0250936 | A1 | 9/2010 | Kusakawa et al. |
| 2010/0275036 | A1 | 10/2010 | Harada et al. |
| 2010/0322418 | A1 | 12/2010 | Potkonjak |
| 2011/0055649 | A1 | 3/2011 | Koushanfar et al. |
| 2011/0055851 | A1 | 3/2011 | Potkonjak et al. |
| 2011/0191837 | A1* | 8/2011 | Guajardo Merchan et al. .. 726/6 |
| 2011/0215829 | A1 | 9/2011 | Guajardo Merchan et al. |
| 2011/0239002 | A1 | 9/2011 | Beckmann et al. |
| 2012/0126840 | A1 | 5/2012 | Lee et al. |
| 2012/0131340 | A1 | 5/2012 | Teuwen et al. |
| 2012/0137137 | A1* | 5/2012 | Brickell et al. ......... 713/182 |
| 2012/0198243 | A1 | 8/2012 | Matsushima et al. |
| 2012/0204023 | A1 | 8/2012 | Kuipers et al. |
| 2012/0224695 | A1 | 9/2012 | Hashimoto et al. |
| 2012/0321077 | A1 | 12/2012 | Shiota et al. |
| 2012/0324310 | A1 | 12/2012 | Oshida et al. |
| 2013/0051552 | A1 | 2/2013 | Handschuh et al. |
| 2013/0141137 | A1 | 6/2013 | Krutzik et al. |
| 2013/0142329 | A1 | 6/2013 | Bell et al. |
| 2013/0147511 | A1* | 6/2013 | Koeberl et al. ......... 326/8 |
| 2013/0185611 | A1 | 7/2013 | Goettfert et al. |
| 2013/0194886 | A1 | 8/2013 | Schrijen et al. |
| 2013/0254636 | A1 | 9/2013 | Kirkpatrick et al. |
| 2014/0032933 | A1 | 1/2014 | Smith et al. |
| 2014/0089659 | A1* | 3/2014 | Brickell et al. ......... 713/155 |
| 2014/0089685 | A1* | 3/2014 | Suzuki ......... 713/193 |
| 2014/0091832 | A1 | 4/2014 | Gotze et al. |
| 2014/0093074 | A1 | 4/2014 | Gotze |
| 2014/0095867 | A1 | 4/2014 | Smith et al. |
| 2014/0201540 | A1 | 7/2014 | Li et al. |

OTHER PUBLICATIONS

Johnson, Randy and Stewart Christie, "JTAG 101 IEEE 1149.x and Software Debug," Jan. 2009, retrieved on Dec. 9, 2012 from http://download.intel.com/design/intarch/papers/321095.pdf, 26 pages.
"Secure Hash Standard," Federal Information Processing Standards Publication 180-2, Aug. 2002, retrieved on Dec. 10, 2012 from http://csrc.nist.gov/publications/fips/fips180-2/fips180-2.pdf, 75 pages.
Maes, Roel, Anthony Van Herrewege, and Ingrid Verbauwhede, "PUFKY: A Fully Functional PUF-based Cryptographic Key Generator," In Cryptographic Hardware and Embedded Systems—CHES 2012, Lecture Notes in Computer Science vol. 7428, copyright 2012, retrieved on Dec. 12, 2012 from https://www.cosic.esat.kuleuven.be/publications/article-2228.pdf, 18 pages.
Katzenbeisser, Stefan, Ünal Kocabas, Vincent van der Leest, Ahmad-Reza Sadeghi, Geert-Jan Schrijen, Heike Schröder, and Christian Wachsmann, "Recyclable PUFs: Logically Reconfigurable PUFs," In Cryptology ePrint Archive, Report 2011/552, dated 2011, retrieved on Dec. 12, 2012 from http://eprint.iacr.org/2011/552.pdf, 15 pages.
Gassend, Blaise, Dwaine Clarke, Martenvan Dijk, and Srinivas Devadas. "Silicon physical random functions," ACM CCS'2002, pp. 148-160.
Guajardo, Jorge, Sandeep S. Kumar, Geert Jan Schrijen, and Pim Tuyls. "FPGA intrinsic PUFs and their use for IP protection". CHES'2007, pp. 63-80.
U.S. Appl. No. 13/631,512, filed Sep. 28, 2012, Titled: "Secure Provisioning of Secret Keys During Integrated Circuit Manufacturing", 81 pages.
U.S. Appl. No. 13/313,298, filed Dec. 7, 2011, Titled: "Offline Device Authentication and Anti-Counterfeiting Using Physically Unclonable Functions", 25 pages.
Application Serial No. PCT/US2011/67881, Application Filed Dec. 29, 2011, Titled: "Secure Key Storage Using Physically Unclonable Functions", 44 pages.
U.S. Appl. No. 13/631,634, filed Sep. 28, 2012, Titled: "Integrated Circuits Having Accessible and Inaccessible Physically Unclonable Functions", 70 pages.
Sanu K. Matthew, et al., U.S. Appl. No. 13/889,849, entitled "Hardware-Embedded Key Based on Random Variations of a Stress-Hardened Integrated Circuit", filed May 8, 2013, 55 pages.
International Preliminary Report on Patentability received for PCT Patent Application No. PCT/US2011/067881, mailed on Jul. 10, 2014, 6 pages.
USPTO Notice of Allowance in U.S. Appl. No. 13/631,634, mailed Sep. 3, 2014, 10 pages.
International Search Report and Written Opinion in International Application No. PCT/US2013/071346, mailed Feb. 27, 2014, 12 pages.
USPTO Nonfinal Rejection in U.S. Appl. No. 13/631,512, mailed Dec. 16, 2013, 21 pages.
USPTO Final Rejection in U.S. Appl. No. 13/631,512, mailed Jun. 5, 2014, 19 pages.
USPTO Nonfinal Rejection in U.S. Appl. No. 13/313,298, mailed Feb. 28, 2013, 15 pages.
Martin Deutschmann, Cryptographic Applications with Physically Unclonable Functions, 18th Nov. 2010.
USPTO Final Rejection in U.S. Appl. No. 13/313,298, mailed May 21, 2013, 15 pages.
USPTO Advisory Action in U.S. Appl. No. 13/313,298, mailed Jul. 16, 2013, 3 pages.
USPTO Nonfinal Rejection in U.S. Appl. No. 13/631,634, mailed Apr. 11, 2014, 11 pages.
Armknecht, Frederik, et al., "A Formal Foundation for the Security Features of Physical Functions," in IEEE Symposium on Security and Privacy (SSP) (May 2011), pp. 397-412.
Bulens, P., et al., "How to Strongly Link Data and its Medium: the Paper Case," IET Information Security, 2009.
Koeberl, P., et al., "A Practical Device Authentication Scheme using SRAM PUFs", Lecture Notes in Computer Science, 2011, vol. 6740/2011, pp. 63-77, DOI: 10.1007/978-3-642-21599-5_5.
Suh, G. Edward, et al., "Physical Unclonable Functions for Device Authentication and Secret Key Generation," Design Automation Conference, 2007, pp. 9-14, DAC '07. 44th ACM/IEEE.
International Search Report and Written Opinion received for PCT Patent Application No. PCT/US2011/067881, mailed on Sep. 25, 2012, 9 pages.
International Search Report received for PCT Patent Application No. PCT/US2013/045517, mailed on Jul. 18, 2014, 3 pages.

* cited by examiner

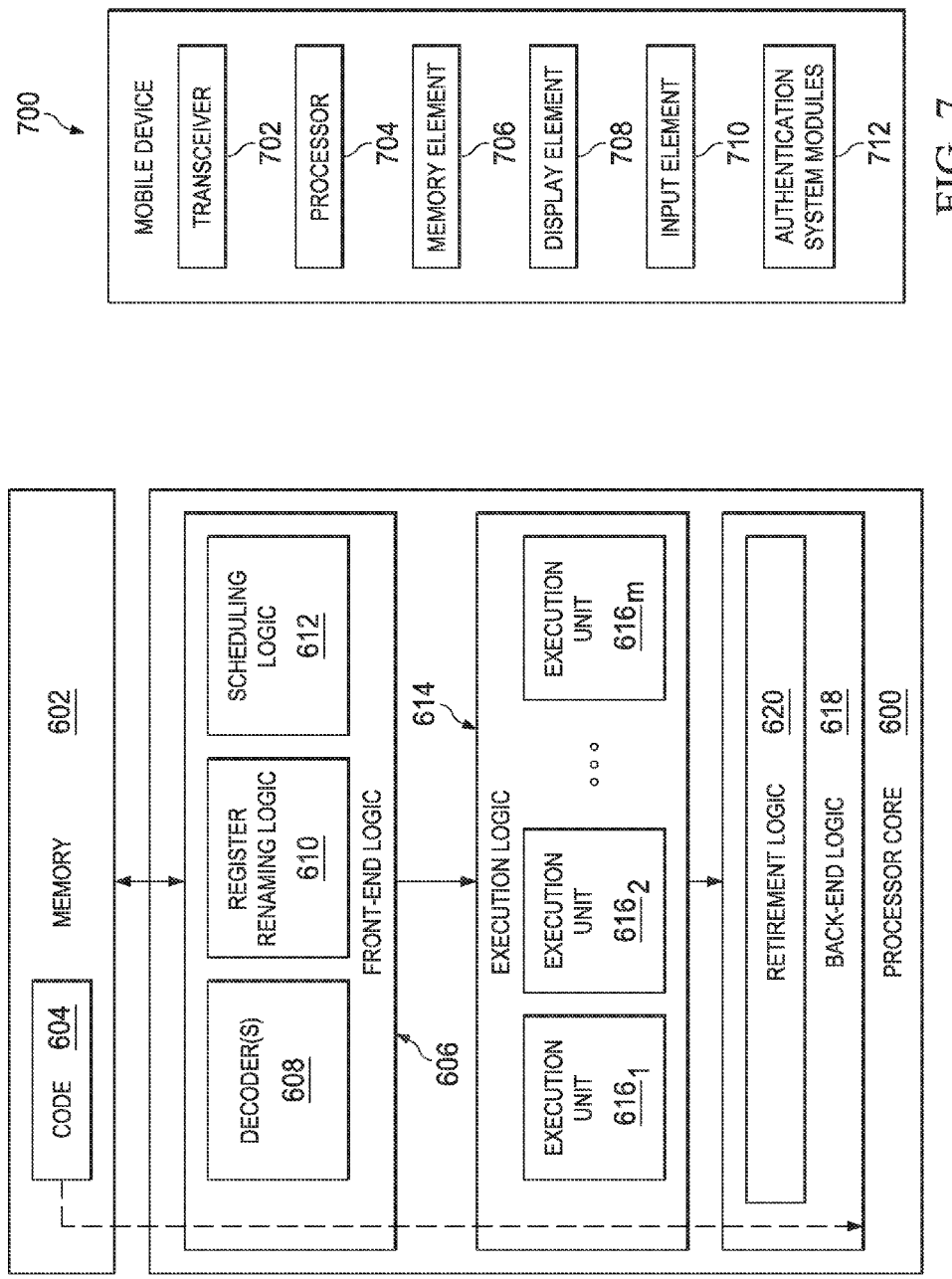

DEVICE AUTHENTICATION USING A PHYSICALLY UNCLONABLE FUNCTIONS BASED KEY GENERATION SYSTEM

TECHNICAL FIELD

This disclosure relates in general to the field of semiconductors and, more particularly, to device authentication using a physically unclonable functions (PUF) based key generation system.

BACKGROUND

The contamination of electronic component supply chains by counterfeit hardware devices is a serious and growing risk in today's globalized marketplace. Copying and counterfeiting devices can occur at different levels. Re-marking is a low-technology technique of counterfeiting a device and accounts for the bulk of the counterfeits detected. In a typical re-marking attack, a device's product markings are misrepresented by replacing the original identification markings with new identification markings indicating a higher specification or higher value part. Such a device, if embedded in an electronic product or system, may fail in the field when subjected to an operational environment for which the original part was not designed. Device failures can lead to the decreased reputation of the device manufacturer. Other counterfeiting techniques can include attempts to clone a device, for example, by copying a fabrication mask or by reverse engineering a device. In these instances, counterfeiters could profit from a remarked device or from a chip design via the unauthorized sale of the cloned chip. Thus, profit margins for legitimate manufacturers of such devices could be detrimentally affected. Additionally, the risk of counterfeit products entering the supply chain generally increase when devices suffer supply shortfalls or have production terminated by the manufacturer. Thus, more effective techniques are needed to protect against unauthorized copying and counterfeiting of hardware devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a block diagram of an exemplary processor according to an embodiment of the present disclosure;

FIG. 7 is a block diagram of an exemplary mobile device system according to an embodiment of the present disclosure.

DETAILED DESCRIPTION OF EXAMPLE EMBODIMENTS

Example Embodiments

Figure 1:
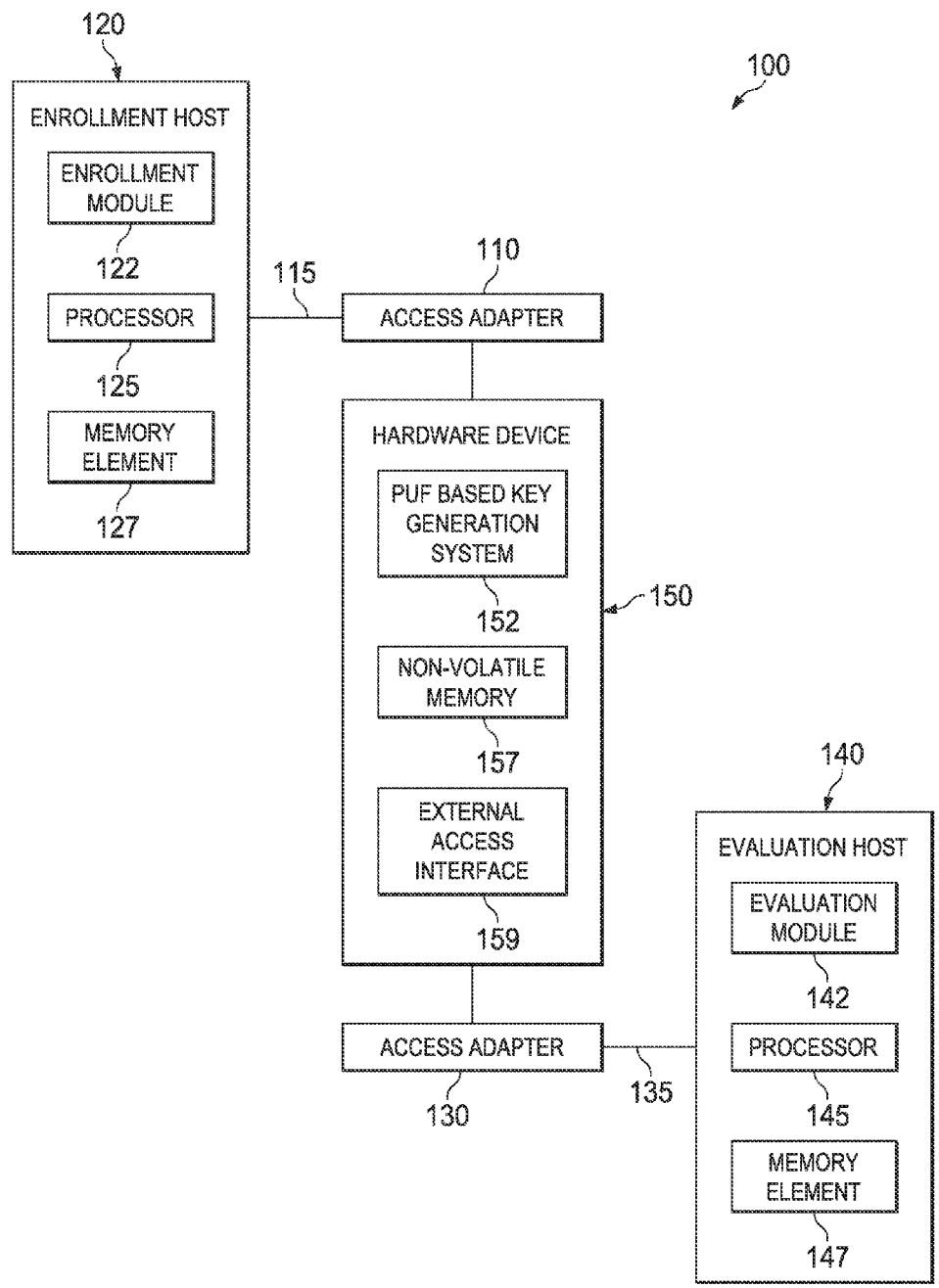
FIG. 1 is a simplified block diagram illustrating a device authentication system using a physically unclonable functions based key generation system, according to an example embodiment.

FIG. 1 is a simplified block diagram illustrating a device authentication system 100 in accordance with an example embodiment. Authentication system 100 can include an enrollment host 120, an evaluation host 140, and a hardware device 150 to be certified and authenticated. Access adapter 110 can facilitate communication between hardware device 150 and enrollment host 120. Access adapter 130 can facilitate communication between hardware device 150 and evaluation host 140. Communication links 115 and 135 can be configured in any suitable form to enable communication between access adapter 110 and enrollment host 120, and between access adapter 130 and evaluation host 140, respectively. Enrollment host 120 can include an enrollment module 122, a processor 125, and a memory element 127. Evaluation host 140 can include an evaluation module 142, a processor 145, and a memory element 147. Hardware device 150 can include a physically unclonable functions (PUF) based key generation system 152, non-volatile memory 157, and an external access interface 159 that enables access to PUF based key generation system 152.

In an example implementation, authentication system 100 can be associated with a device manufacturer of hardware device 150 via enrollment host 120 and access adapter 110, when the hardware device is manufactured. Authentication system 100 can also be associated with a manufacturer of other electronic devices (also referred to herein as a 'verifier') via evaluation host 140 and access adapter 130, when hardware device 150 is used to produce other electronic devices.

For purposes of illustrating the techniques of authentication system 100, it is important to understand the activities and security concerns that may be present in electronic component supply chains and hardware devices in those supply chains, as shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

Counterfeit semiconductor devices often enter the electronic component supply chain in manufacturing environments during the assembly phase of an electronic device (e.g., personal computer, laptop, mobile device such as a smartphone, tablet, eBook reader, etc., gaming system, etc.). Generally, a variety of semiconductor devices, also referred to herein as 'hardware devices', such as integrated circuits or chips, are used in the assembly phase to build a given electronic device. Counterfeit chips can cause an electronic device to fail if the chip does not meet the required specifications. In addition, product failures can lead to a diminished reputation of the electronic device and its manufacturer. A diminished reputation often translates to lost revenue and decreased market share. Accordingly, manufacturers of electronic devices want assurances that the chips being used to build the electronic devices are authentic and not counterfeit chips.

Current practices for detecting counterfeit semiconductor devices include manual inspection such as visual checking, electronic testing, reliability testing, and destructive testing, which can require significant investments in expertise, equipment, and time. Additionally, these methods can be very expensive. Moreover, such methods cannot guarantee the provenance or performance of a device and, in many cases, it may only be feasible to perform testing on a sample of devices, for example when tests are destructive.

Some methods of device authentication might not be able to protect against certain types of counterfeiting such as cloning. For instance, a unique identifier in a register may not protect against cloning a device. If a unique ID is stored in fuses or some type of non-volatile memory, a counterfeiter could clone the device and store a different unique identifier in the register.

Other anti-counterfeiting techniques may have other drawbacks. For instance, one commonly used anti-counterfeiting technique is the CPU_ID (central processing unit identifier) mechanism, which supports identification of CPU features. However, the mechanism is not sufficient to differentiate two individual instances of the same device type.

A physically unclonable function (PUF), may be used as a foundation of a security primitive to build a more effective authentication scheme. A PUF is a physical system that, when measured or challenged, provides unique, repeatable and unpredictable responses. Creating a physical copy of the PUF with an identical challenge-response behavior is difficult, resulting in a structure which is unclonable even by the manufacturer.

Silicon PUF implementations leverage the complementary metal-oxide-semiconductor (CMOS) manufacturing technology used to fabricate the majority of integrated circuits (ICs) today. Silicon PUFs exploit the uncontrollable manufacturing variations that are a result of integrated circuit fabrication processes. Manufacturing variation of parameters, such as dopant concentrations and line widths, manifest themselves as differences in timing behavior between instances of the same integrated circuit design. These timing differences can be measured using a suitable circuit to extract a fingerprint for the chip.

Many different silicon PUFs have been proposed. For example, an arbiter PUF compares the relative delay of two delay paths using a series of configurable delay elements terminated by an arbiter. By using a PUF challenge as the delay element configuration vector, the circuit exhibits a challenge space which is exponential in the number of challenge bits.

A ring oscillator PUF compares the relative frequencies of self-oscillating delay loops in order to generate PUF responses. A single response bit can thus be generated by a pair of oscillators Another PUF type is based on the power-up state of uninitialized six-transistor SRAM cells. The storage mechanism in an SRAM cell consists of four cross-coupled transistors that assume one of two stable states after power-up. Which state the cell enters is largely determined by the relative characteristics of the transistors, so any mismatch causes the cell to have a bias to one of the states. The mismatch is fixed at manufacturing time, resulting in a cell that tends to power up in the same state. The power-up behavior is random between cells, but robust for a single cell, resulting in a structure that is well suited for use as a PUF. The challenge in the case of an SRAM PUF can be considered to be a set of SRAM addresses, and the response the contents of those addresses post power-up.

While some standardized methods for providing device traceability and authentication have been defined, at least some of these are serialization mechanisms based on the generation of unpredictable, random codes and are intended to be applied at the device package and higher levels. Authentication methods using PUFs may require on-line access to secure manufacturer databases which could constrain their deployment in production facilities. Additionally, PUFs with large challenge-response pairs may be required. Other mechanisms may require a large number of PUF instances in a single device in order to be robust against hardware simulator attacks. Also, mechanisms that allow off-line authentication can have some amount of false acceptance rates and false rejection rates if the device identifier is changeable (e.g., under different temperatures, voltages, and/or thermal noise).

Authentication system 100 of FIG. 1 resolves many of the aforementioned issues (and more). Authentication system 100 prevents counterfeiting of hardware devices by using a physically unclonable functions based key generation system to generate and derive keys for the hardware devices. A PUF based key generation system is embedded in a hardware device during its manufacturing. During an enrollment phase of authentication system 100, a large number of keys (e.g., 1000 keys, etc.) are generated as the intrinsic hardware identifier of the hardware device. The device manufacturer certifies the device by storing a device certificate in the hardware device. The hardware device may be shipped to a verifier (e.g., a manufacturer of other electronic devices in which the hardware device is integrated) via an untrusted supply chain. During an evaluation phase of authentication system 100, the verifier authenticates the hardware device and validates that the hardware device is a genuine device from the original device manufacturer. Authentication can be performed by generating the same keys from the hardware device to verify the device identifier, and by using the manufacturer public key to verify the signature on the device certificate.

Turning to the infrastructure of FIG. 1, a brief description is provided about some of the possible infrastructure that may be included in authentication system 100. Authentication system 100 may span multiple, possibly discrete, network environments in example embodiments. A network environment for an enrollment phase of authentication system 100 may be provided, at least in part, by enrollment host 120 and access adapter 110. Hardware device 150 may be connected to access adapter 110 during the enrollment phase. A separate network environment for an evaluation phase of authentication system 100 may be provided, at least in part, by evaluation host 140 and access adapter 130. Hardware device 150 may be connected to access adapter 130 during the evaluation phase.

Enrollment host 120 and evaluation host 140 are computing systems of authentication system 100 that provide enrollment (or certification) functions and evaluation (or authentication) functions, respectively. These functions are provided for hardware devices, such as hardware device 150. As used herein, 'computing systems' are intended to encompass servers, appliances, personal computers, laptops, mobile devices, processors, modules, or any other suitable device, component, element, proprietary appliance, or object operable to exchange information in a network environment.

Hosts 120 and 140 can include logic to achieve (or to foster) the enrollment and evaluation functions, as outlined herein. Each of these elements can have an internal structure (e.g., processors 125, 145, memory elements 127, 147, etc.) to facilitate some of the operations described herein. Computing systems and other network elements (e.g., routers, gateways, switches, bridges, loadbalancers, firewalls, adapters, etc.) may include any suitable algorithms, hardware, software, components, modules, interfaces, communication protocols, or objects that facilitate the operations thereof and that enable receiving, transmitting, and/or otherwise communicating data or information in a network environment.

In other embodiments, these enrollment and evaluation functions may be executed, in whole or in part, externally to these elements or included in some other computing system to achieve this intended functionality. For instance, enrollment functions could be provided in a server or appliance (e.g., serving a device manufacturer facility) and could communicate with host 120 via a network. The server or appliance could also communicate with multiple other hosts (e.g., hosts that access hardware devices at a device manufacturer facility). Similarly, evaluation functions could be provided in a server or appliance (e.g., serving a verifier that receives hardware devices from device manufacturers) and could communicate with host 140 via a network. The server or appliance could also communicate with multiple other hosts (e.g., hosts accessing hardware devices at a verifier's facility).

Networks enabling communication between hosts and other computing systems or network elements could each represent a series of points or nodes of interconnected communication paths for receiving and transmitting packets of information. These networks offer a communicative interface between nodes, and may be configured as local area networks (LANs), wireless local area networks (WLANs), wide area networks (WANs), Intranet, Extranet, virtual private networks (VPNs), or any other suitable network configuration, or any combination thereof, including wired and wireless networks. Additionally, radio signal communications over a cellular network may also be provided in authentication system 100, and suitable interfaces and infrastructure may be provided to enable communication with the cellular network.

Some portions of authentication system 100 may include a configuration capable of transmission control protocol/internet protocol (TCP/IP) communications for the transmission and/or reception of packets in a network. Some portions of authentication system 100 may also operate in conjunction with a user datagram protocol/IP (UDP/IP) or any other suitable protocol, where appropriate and based on particular needs. The term 'data' as used herein, refers to any type of binary, numeric, voice, video, media, textual, or script data, or any type of source or object code, or any other suitable information in any appropriate format that may be communicated from one point to another in electronic devices, hardware devices, and/or networks.

In the enrollment phase, enrollment host 120 is connected to hardware device 150 through some type of adapter, represented by access adapter 110. In the evaluation phase, evaluation host 140 is connected to hardware device 150 through some type of adapter, represented by access adapter 130. One common way of accessing a PUF based key generation system on a hardware device is the Joint Test Action Group (JTAG) standard, which is formally referred to as the Institute of Electrical and Electronics Engineers 1149.1-2001 Standard Test Access Port and Boundary-Scan Architecture, Jul. 23, 2001. Access adapters 110 and 130 can be JTAG adapters, and can be connected to enrollment host 120 and evaluation host 130, respectively, via any suitable interfaces 115 and 135. Interfaces 115 and 135 can include, but are not limited to, Ethernet, peripheral component interconnect (PCI), and universal serial bus (USB).

The JTAG standard defines a generic external test access port, which is represented by external access interface 159 in hardware device 150. This external test access port can provide an interface to PUF based key generation system 152 during the enrollment phase, and also during the evaluation phase. Its architecture allows the evaluation phase to occur post assembly on fully populated boards. JTAG is often used to perform boundary scan testing to determine whether openings or shorts were created during the soldering process of a printed circuit board (PCB). JTAG can be used in authentication system 100 to read keys from PUF based key generation system 152 and to read the device certificate from non-volatile memory 157 of the hardware device. Although JTAG is one example industry standard that could be used to obtain the needed information (e.g., keys and device certificate), other standards could be implemented as well.

Hardware device 150 can be any semiconductor device on which a PUF based key generation system can be embedded. Examples of hardware device 150 include, but are not limited to, integrated circuits, central processing units (CPUs), microprocessors, chipsets, system on a chip (SoCs), random access memory (RAM), read-only memory (ROM), etc.

PUF based key generation system 152 is embedded on hardware device 150 and is configured to generate a large number of keys. The keys can be used by authentication system 100 as the intrinsic hardware identifier of hardware device 150. As the number of generated keys increases, the security of the system also increases. If the number of keys becomes too large, however, system performance may be affected such that the certification and authentication activities could potentially experience delays. In an example implementation, PUF based key generation system 152 could generate in the range of 500 to 5000 keys. This range is provided for illustrative purposes, and it will be apparent that authentication system 100 could be configured to generate a number of keys outside the illustrative range. Thus, although many keys may be used by authentication system 100 to authenticate a single hardware device, the actual number of keys that can be generated is flexible and can be configured based on particular requirements and needs of device manufacturers and/or verifiers.

A PUF based key generation system uses PUFs as an underlying static entropy source from which to generate one or more PUF root keys. The underlying static entropy source is platform-unique and externally-unknown. Because PUF bits may not be completely static and may not have full entropy, PUF bits are not directly used as a PUF root key. Instead, PUF bits are generally post-processed first. A post processing function (also referred to as a fuzzy extractor) can apply error correction and entropy extraction to the PUF bits. Within the key generation system, more keys can be derived from the PUF root keys using cryptographic key derivation functions.

In one example, a Logically Reconfigurable PUF (LR-PUF) enables multiple outputted keys to be cryptographically derived from the PUF value. A logically reconfigurable PUF provides challenge/response behavior that depends on both the physical properties of the PUF and on the logical state maintained by control logic. Thus, by updating the state of a reconfigurable PUF, its challenge/response behavior can be dynamically changed. Updating the state to dynamically change the challenge/response behavior can be achieved after the reconfigurable PUF has been deployed in a hardware device.

In a particular example of a reconfigurable PUF, a state is stored in non-volatile memory and is maintained by control logic. The control logic includes an algorithm that queries the LR-PUF and an algorithm that reconfigures the LR-PUF. The query algorithm computes a challenge, evaluates a response, and returns a result. The reconfiguring algorithm reconfigures the LR-PUF by changing the current state to a new independent state. An adversary can know the current and previous states of the LR-PUF, but cannot change the state to a previous LR-PUF state.

Other PUF based key generation systems may produce a single key, rather than multiple keys. For these systems, a cryptographic key derivation in hardware may be implemented to derive a large number (potentially unlimited) of keys. Additionally, any other PUF based key generation system, from which a large number of keys can be generated, may be embedded in hardware device 150 to generate keys during enrollment and evaluation phases of authentication system 100.

Domain separation of PUF-based key generation system 152 may be provided to prevent a verifier in the supply chain, or another entity that gains access to the hardware device, from accessing the PUF-based key generation system and learning the keys of the platform. Accordingly, separate physical instances of the PUF-based key generation system can be implemented in a single hardware device. One instance can be dedicated for certification and authentication, while the other instance can be dedicated for internal platform keys. External access interface 159 may provide external access to the PUF-based key generation system dedicated to certification and authentication, but not to the PUF-based key generation system dedicated to internal platform keys. This configuration ensures that verifiers in the supply chain (and others) cannot access internal platform keys.

Non-volatile memory 157 may be used to store a device certificate generated by enrollment host 120. Examples of non-volatile memory include, but are not limited to, flash memory and fuses. However, not all hardware devices have non-volatile memory. In this scenario, the device certificate could be stored on the IC package using 2D data matrix (e.g., Data Matrix Error Checking and Correction (ECC) 200 Standard). By using 2D data matrix, a 44×44 matrix can encode 1136-bit. At a resolution of 600 DPI, the data matrix only takes approximately 8 mm×8 mm space.

Figure 2:
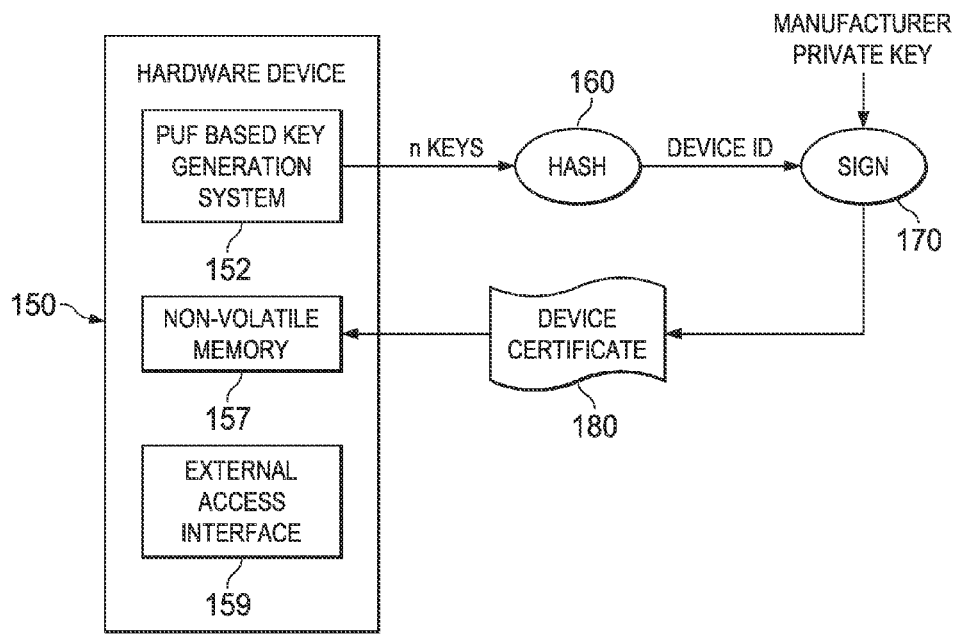
FIG. 2 is a simplified interaction diagram of a hardware device during an enrollment phase of the authentication system according to an embodiment.

Turning to FIG. 2, an interaction diagram of an enrollment phase of authentication system 100 is illustrated. The enrollment phase involves certifying a hardware device by a device manufacturer. Certification may be accomplished using a public/private key pair and a unique device identifier. Assume (mpk, msk) are the device manufacturer's public verification key and private signing key pair. The device manufacturer embeds PUF based key generation system 152 into hardware device 150. The manufacturer queries PUF based key generation system 152 to obtain n-number of device keys. The manufacturer hashes, at 160, the outputted n keys into a smaller device identifier ($id_D$), also referred to herein as 'device ID'. Any robust, cryptographic hash function may be used. The manufacturer uses the device manufacturer's private signing key (mpk) to sign $id_D$, at 170, to create digital signature σ. The manufacturer sets device certificate ($id_D$, σ) 180, and stores the device certificate in non-volatile memory 157 of hardware device 150.

Public key cryptology is a mechanism in which a mathematically linked key pair, including a private signing key and a public key, can be used to secure data being sent from a sender to a receiver and to verify the authenticity of the data. A digital signature is a mechanism in which the data is proved to have originated from a particular sender. The private key, which may be known only to the sender, can be used to encrypt the data, or a portion thereof, to generate the digital signature. In authentication system 100, the device identifier ($id_D$) can be the data that is encrypted to create the digital signature (σ). The encrypted data or digital signature can be sent to a receiving entity (e.g., the verifier). The receiving entity can use the public key of the key pair to decrypt the digital signature and verify the authenticity of the data. The public key may be sent to the receiving entity along with the digital signature or may be otherwise provided to the receiving entity.

Figure 3:
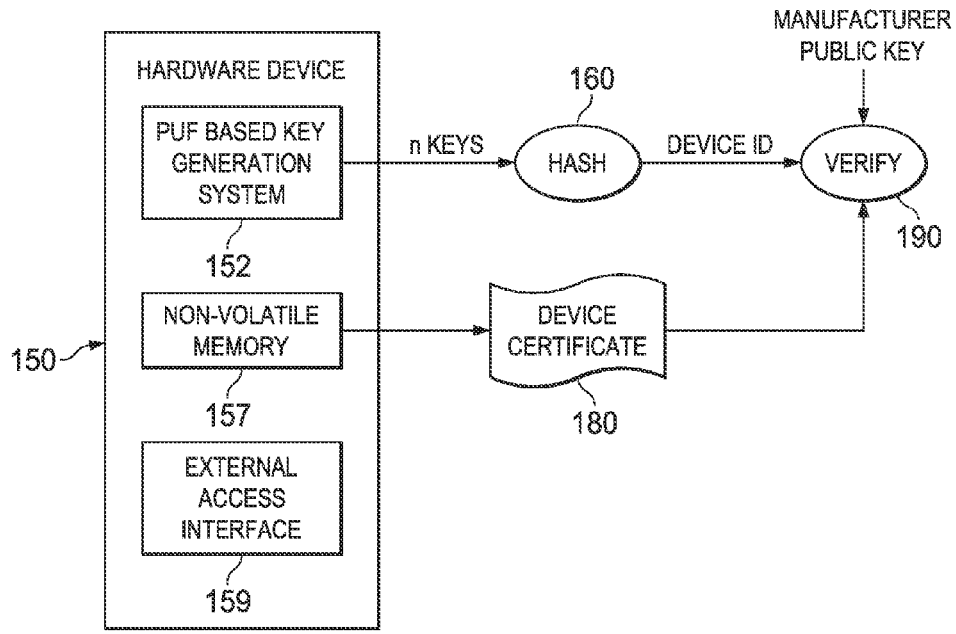
FIG. 3 is a simplified interaction diagram of a hardware device during an evaluation phase of the authentication system according to an embodiment.

Turning to FIG. 3, an interaction diagram of an evaluation phase of authentication system 100 is illustrated. The evaluation phase involves verifying a hardware device by a verifier (e.g., a manufacturer of electronic devices in which the hardware device is integrated). Once the verifier obtains hardware device 150 from the supply chain, the hardware device can be verified. The verifier can query PUF based key generation system 152 to obtain n keys, which should be the same n keys that were obtained in the enrollment phase. The verifier hashes, at 160, the outputted n keys into a smaller device identifier ($id_D'$). The same cryptographic hash function used during the enrollment phase is used during the evaluation phase. The verifier reads device certificate ($id_D$, σ) 180 from non-volatile memory 157 of hardware device 150. The verifier can verify, at 190, the device identity by checking whether $id_D$ matches $id_D'$. If they do not match, the verifier may reject hardware device 150 as not being authenticated. The verifier can also use the device manufacturer's public verification key (mpk) to verify, at 190, the digital signature σ on $id_D$. If the signature verification fails, then the verifier may reject hardware device 150 as not being authenticated.

The queries to the PUF based key generation system to obtain n device keys can be the same query in both the enrollment phase (e.g., by the device manufacturer) and the evaluation phase (e.g., by the verifier). The number of keys can be set as n=512, n=1024, or n=2048, for example. The queries can be hardcoded in the hardware, or can be provided to hardware device 150 during the query. For instance, the first query can be set as 'anti-counterfeiting-1' to obtain $key_1$, the second query can be set as 'anti-counterfeiting-2' to obtain $key_2$, etc. Also, the queries can be public.

The use of a PUF based key generation system to generate multiple device keys for a digital signature scheme is an effective and reliable anti-counterfeiting solution for hardware devices. In example embodiments, the device certificate is digitally signed and bound to the device ID. Given the collision-resistant property of the hash function (e.g., SHA-256), an attacker has to forge all of the n keys from the PUF based key generation system in order for the forged device to be successfully verified. Because the PUF is unclonable, an attacker of authentication system 100 must be capable of simulating all of the device keys in hardware and outputting the device keys to the verifier during device authentication. If the number of keys is reasonably large, then the expense of hardcoding the keys in hardware can make an attack uneconomic for a potential attacker.

Additionally, authentication system 100 may be simple and inexpensive to implement. It may not require any secure, on-line database access during the evaluation phase. Any additional non-volatile storage potentially needed for the device may be small, in some embodiments, and thus, a cost effective solution may be implemented. In addition, authentication system 100 may only need a small amount of PUF circuitry used for a PUF based key generation system. Unlike many PUF applications, the PUF queries and device certificates can be public, and unprotected in some embodiments. Additionally, error correction or fuzzy extractors may not be needed in some embodiments. Also, the false acceptance and rejection rates of an authentication system using a PUF based key generation system are minimal to zero.

Figure 4:
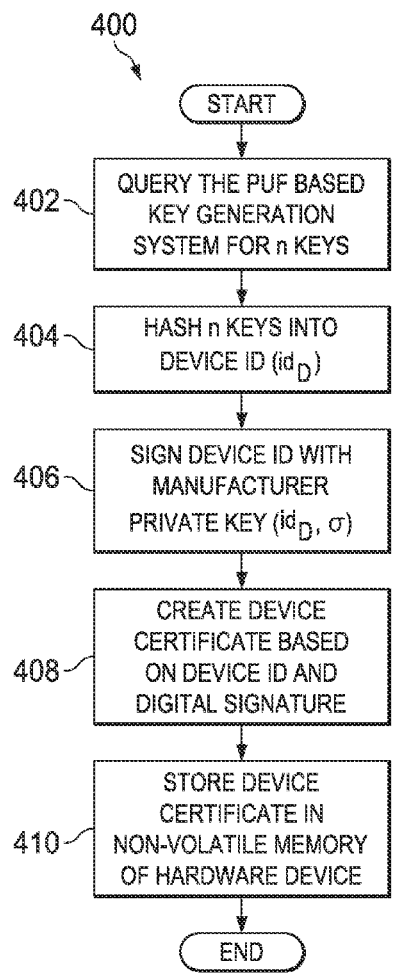
FIG. 4 is a simplified flow chart illustrating example operations that may be associated with embodiments of the present disclosure.

Turning to FIG. 4, an example flow 400 of operations is illustrated, which may be associated with the enrollment phase of an embodiment of authentication system 100. In one example implementation, some or all of flow 400 may be performed by enrollment module 122 of enrollment host 120. Flow 400 may be implemented in hardware, software, firmware, or any suitable combination thereof.

In the enrollment phase, a hardware device is certified by the device manufacturer. Assume (mpk, msk) are the device manufacturer's public verification key and private signing key of a key pair. In an example embodiment, the manufacturer embeds a PUF based key generation system in the hardware device. The PUF based key generation system may have other usages. In other embodiments, however, the PUF based key generation system may be dedicated to providing device keys for certification and authentication while another PUF system may be embedded in the hardware device and dedicated to other usages (e.g., platform keys).

At 402, the device manufacturer (e.g., via enrollment module 122 of enrollment host 120) queries the PUF based key generation system embedded in the hardware device for n keys. For example, the number of keys may be set at 512, 1024, or 2048. These queries may be public, and can be hardcoded in the hardware or can be provided to the hardware device during the query. A query may be made for each key of the n keys.

After receiving all of the n keys from the PUF based key generation system, at 404, the device manufacturer hashes all of the outputted n keys into a smaller device ID ($id_D$). A cryptographic hash function may be applied to the n keys to obtain the device ID ($id_D$). A cryptographic hash function is an algorithm that takes an arbitrary block of data and returns a fixed-size bit string, such that any change to the data is very likely to result in a change to the hash value. An example of a robust cryptographic hash function that could be used includes, but is not limited to, SHA-256, designed by the National Security Agency (NSA) and published in 2002 by the National Institute of Standards and Technology (NIST) as a U.S. Federal Information Processing Standard (FIPS).

At 406, the manufacturer can use its private signing key (msk) to sign the device ID ($id_D$) and create a digital signature σ. At 408, the manufacturer creates the device certificate ($id_D$, σ) based on the device ID and the digital signature. At 410, the manufacturer stores the device certificate in the non-volatile memory of the hardware device.

Figure 5:
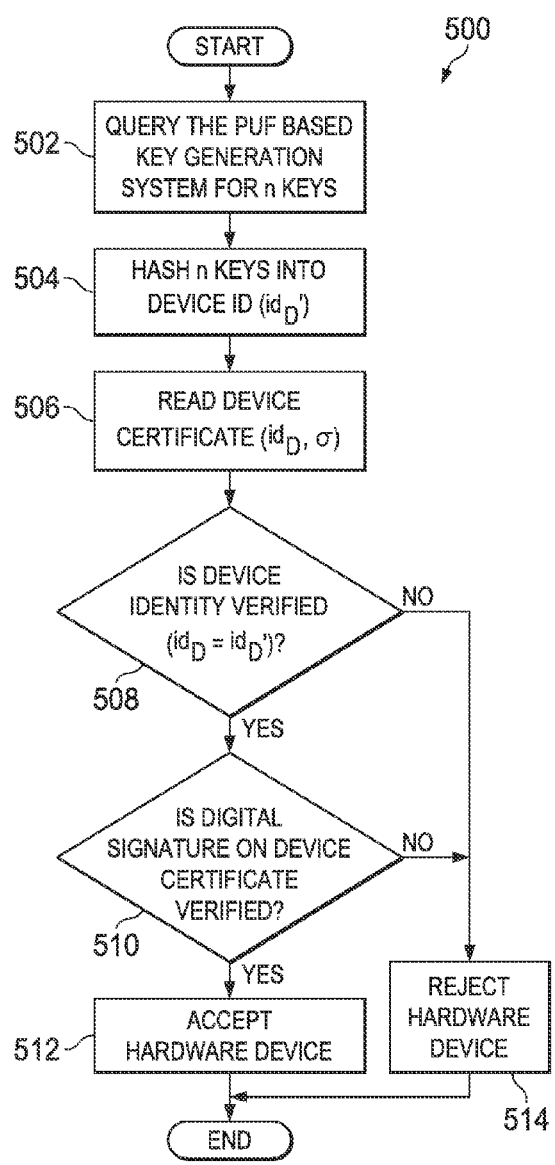
FIG. 5 is a simplified flow chart illustrating further example operations that may be associated with an embodiment of the present disclosure.

Turning to FIG. 5, an example flow 500 of operations is illustrated, which may be associated with the evaluation phase of an embodiment of authentication system 100. In one example implementation, some or all of flow 500 may be performed by evaluation module 142 of evaluation host 140. Flow 400 may be implemented in hardware, software, firmware, or any suitable combination thereof.

In the evaluation phase, a verifier receives a hardware device presumably from the supply chain (e.g., from a device manufacturer). In a counterfeiting attack, however, the hardware device may be supplied by a counterfeiting entity. At 502, the verifier (e.g., via evaluation module 142 of evaluation host 140) queries the PUF based key generation system embedded in the hardware device for n keys. For example, the number of keys may be set at 512, 1024, or 2048. The number of keys is set to the same amount as the number of keys that are set in the enrollment phase. These queries may be public, and can be hardcoded in the hardware or can be provided to the hardware device during the query. A query may be made for each key of the n keys.

At 504, the verifier hashes all of the outputted n keys into a smaller device ID ($id_D'$). The verifier uses the same cryptographic hash function that is used by the enrollment module to hash the multiple device keys into a smaller device ID. At 506, the verifier can read the device certificate ($id_D$, σ). For example, the device certificate can be read from the non-volatile memory of the hardware device.

At 508, the verifier verifies the device identity. If the device ID generated in the enrollment phase does not match the device ID from the evaluation phase (i.e., $id_D \neq id_D'$), then the verification fails. A result that indicates the device identifier verification failed may be provided to the verifier in any appropriate manner (e.g., a report, a display screen message or alert, a text message, an email, etc.). If the device identifier verification fails, then the hardware device may be rejected by the verifier at 514, and not integrated into an electronic device being built.

Otherwise, if the device ID generated in the enrollment phase matches the device ID from the evaluation phase (i.e., $id_D = id_D'$), then at 510, the digital signature on the device certificate can be verified. The digital signature can be verified using the manufacturer public key (mpk). If the digital signature verification fails, a result that indicates the digital signature verification failed may be provided to the verifier in any appropriate manner (e.g., a report, a display screen message or alert, a text message, an email, etc.). If the digital signature verification fails, then the hardware device may be rejected by the verifier at 514, and not integrated into an electronic device being built. However, if the digital signature is verified at 510, and if the device identity is verified at 508, then the hardware device may be accepted by the verifier at 512, and integrated into an electronic device.

Figure 8:
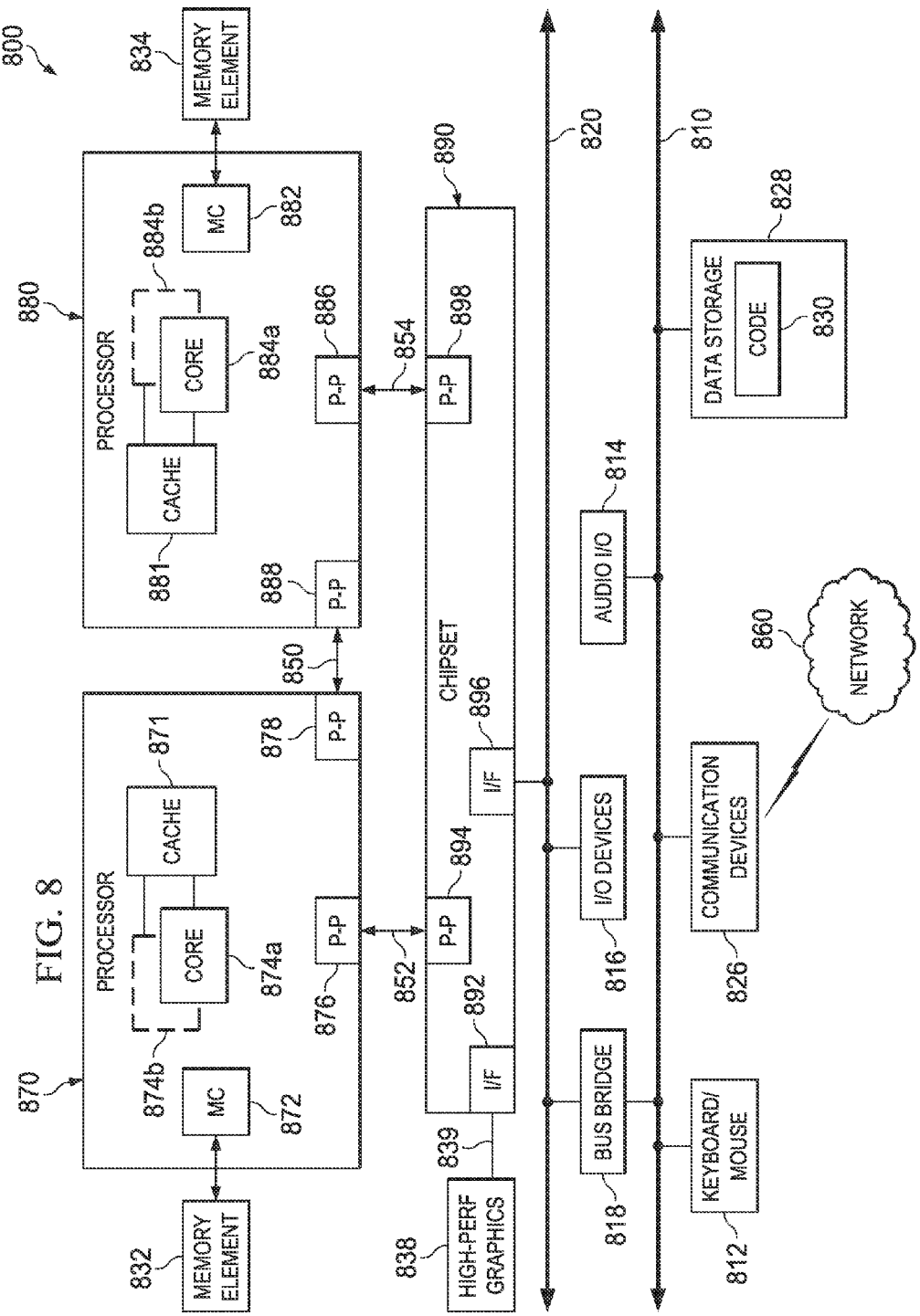
FIG. 8 is a block diagram of an exemplary computing system according to an embodiment of the present disclosure.

FIGS. 6-8 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 6-8.

FIG. 6 is an example illustration of a processor according to an embodiment. Processor 600 is one example embodiment of processors 125 and 145 of enrollment host 120 and evaluation host 140, respectively. Additionally, processor 600 is an example of a type of hardware device that can be authenticated by authentication system 100.

Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with the certification and authentication operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units $616_1$ through $616_m$. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Referring now to FIG. 7, a block diagram is illustrated of an example mobile device 700. Mobile device 700 is an example of a possible computing system of authentication system 100. In an embodiment, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 700 illustrated in FIG. 7 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 702 is connected to a processor 704, which may perform the bulk of the digital signal processing of signals to be communicated and signals received, at the baseband frequency. Processor 704 can provide a graphics interface to a display element 708, for the display of text, graphics, and video to a user. Processor 704 may include an embodiment as shown and described with reference to processor 600 of FIG. 6.

In an aspect of this disclosure, processor 704 may be a processor that can execute any type of instructions to achieve authentication of a hardware device using a PUF based key generation system, as detailed herein. Processor 704 may also be coupled to a memory element 706 for storing information to be used in achieving the authentication operations. Additional details of an example processor 704 and memory element 706 are subsequently described herein. In an example embodiment, mobile device 700 may be designed with a system-on-a-chip (SoC) architecture, which integrates many or all components of the mobile device into a single chip, in at least some embodiments.

In an aspect of this disclosure, memory element 706 of mobile device 700 may also include authentication system modules 712. For example, authentication system modules 712 can include enrollment module 122 when mobile device 700 functions as enrollment host 120. Authentication system modules 712 can include evaluation module 145 when mobile device 700 functions as evaluation host 140.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems or hosts of authentication system 100 may be configured in the same or similar manner as computing system 800. For example, enrollment host 120 and evaluation host 140, shown and described herein, may each be configured in the same or similar manner as exemplary computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations associated with authentication of devices using a PUF based key generation system, as outlined herein.

Processors 870 and 880 may be any type of processor, such as those discussed with reference to processor 600 of FIG. 6, and processors 125 and 145 of FIG. 1. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

At least one embodiment, as disclosed herein, may be at least partially provided within the processors 1102 and 1104. Other embodiments, however, may exist, at least partially, in other circuits, logic units, or devices within the authentication system 100 of FIG. 1. Furthermore, other embodiments may be distributed throughout several circuits, logic units, or devices.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving authentication of hardware devices using a PUF based key generation system, as provided herein.

The enrollment and evaluation functions of authentication system 100, outlined herein, may be implemented by logic encoded in one or more tangible media (e.g., embedded logic provided in an application specific integrated circuit (ASIC), digital signal processor (DSP) instructions, software (potentially inclusive of object code and source code) to be executed by a processor (e.g., processor 600) or other similar machine, etc.). The tangible media may be non-transitory in at least some embodiments. In some of these instances, memory (e.g., memory 602) can store data used for the operations described herein. This includes the memory being able to store software, logic, code, or processor instructions that are executed to carry out the activities described in this Specification. In an embodiment, the tangible media may be provided in each one of hosts 120 and 140.

Additionally, the information being tracked, sent, received, or stored in authentication system 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more network elements, computing systems, modules, and/or other components. However, this has been done for purposes of clarity and example only. It should be appreciated that the system can be consolidated in any suitable manner. Along similar design alternatives, any of the illustrated modules, nodes, elements, and other components of FIG. 1 may be combined in various possible configurations, all of which are clearly within the broad scope of this Specification. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The following examples pertain to embodiments in accordance with this Specification. One or more embodiments may provide at least one machine accessible storage medium having instructions stored thereon for certifying a hardware device. The instructions, when executed by a processor, cause the processor to: receive two or more device keys from a physically unclonable function (PUF) on the hardware device; generate a device identifier from the two or more device keys; generate a digital signature based on the device identifier and a private key; create a device certificate based on the device identifier and the digital signature; and store the device certificate in a memory element.

In an example of an embodiment, the physically unclonable function is configured on the hardware device to generate the two or more device keys, and wherein the keys uniquely identify the hardware device.

In an example of an embodiment, the memory element is a non-volatile memory element included in the hardware device with the physically unclonable function.

In an example of an embodiment, the two or more device keys include between 500-5000 keys.

An example of an embodiment comprises further instructions that when executed by the processor cause the processor to query the physically unclonable function on the hardware device for each of the two or more device keys.

In an example of an embodiment, generating the device identifier includes applying a cryptographic hash algorithm to the two or more keys.

One or more embodiments include an apparatus for certifying a hardware device. The apparatus comprises a processor and an enrollment module executing on the processor. The enrollment module may be configured to: receive two or more device keys from a physically unclonable function (PUF) on the hardware device; generate a device identifier from the two or more device keys; generate a digital signature based on the device identifier and a private key; create a device certificate based on the device identifier and the digital signature; and store the device certificate in a memory element.

In an example of an embodiment, the physically unclonable function is configured on the hardware device to generate the two or more device keys, and wherein the keys uniquely identify the hardware device.

In an example of an embodiment, the memory element is a non-volatile memory element included in the hardware device with the physically unclonable function.

In an example of an embodiment, the two or more device keys include between 500-5000 keys.

In an example of an embodiment, the enrollment module is further configured to query the physically unclonable function on the hardware device for each of the two or more device keys.

In an example of an embodiment, the enrollment module is further configured to apply a cryptographic hash algorithm to the two or more keys to generate the device identifier.

One or more embodiments may provide at least one machine accessible storage medium having instructions stored thereon for authenticating a hardware device. The instructions, when executed by a processor, cause the processor to: receive two or more device keys from a physically unclonable function (PUF) on the hardware device; generate a device identifier from the two or more device keys; obtain a device certificate from the hardware device; perform a verification of the device identifier; and provide a result of the device identifier verification.

In an example of an embodiment, the hardware device is rejected if the result indicates the device identifier verification failed.

An example of an embodiment comprises further instructions that when executed by the processor cause the processor to apply a cryptographic hash algorithm to the two or more keys to generate the device identifier.

An example of an embodiment comprises further instructions that when executed by the processor cause the processor to compare the device identifier to a previously generated device identifier to perform the device identifier verification.

In an example of an embodiment, if the device identifier and the previously generated device identifier do not match, the result indicates that the device identifier verification failed.

An example of an embodiment comprises further instructions that when executed by the processor cause the processor to: perform a verification of a digital signature in the device certificate; and provide a result of the digital signature verification.

In an example of an embodiment, the hardware device is rejected if the result indicates the digital signature verification failed.

An example of an embodiment comprises further instructions that when executed by the processor cause the processor to use a public key of a key pair to decrypt the digital signature to perform the digital signature verification.

An example of an embodiment comprises further instructions that when executed by the processor cause the processor to query the physically unclonable function on the hardware device for each of the two or more device keys.

One or more embodiments include an apparatus for authenticating a hardware device. The apparatus comprises a processor; and an enrollment module executing on the processor. The enrollment module may be configured to: receive two or more device keys from a physically unclonable function (PUF) on the hardware device; generate a device identifier from the two or more device keys; obtain a device certificate from the hardware device; perform a verification of the device identifier; and provide a result of the device identifier verification.

In an example of an embodiment, the hardware device is rejected if the result indicates the device identifier verification failed.

In an example of an embodiment, the evaluation module is further configured to apply a cryptographic hash algorithm to the two or more keys to generate the device identifier.

In an example of an embodiment, the evaluation module is further configured to compare the device identifier to a previously generated device identifier to perform the device identifier verification.

In an example of an embodiment, if the device identifier and the previously generated device identifier do not match, the result indicates that the device identifier verification failed.

In an example of an embodiment, the evaluation module is further configured to: perform a verification of a digital signature in the device certificate; and provide a result of the digital signature verification.

In an example of an embodiment, the hardware device is rejected if the result indicates the digital signature verification failed.

In an example of an embodiment, the evaluation module is further configured to use a public key of a key pair to decrypt the digital signature to perform the digital signature verification.

In an example of an embodiment, the evaluation module is further configured to query the physically unclonable function on the hardware device for each of the two or more device keys.

One or more embodiments may provide a method for certifying a hardware device. The method may comprise: receiving two or more device keys from a physically unclonable function on the hardware device; generating a device identifier from the two or more device keys; generating a digital signature based on the device identifier and a private key; creating a device certificate based on the device identifier and the digital signature; and storing the device certificate in a memory element.

One or more embodiments may provide a method for authenticating a hardware device. The method may comprise: receiving two or more device keys from a physically unclonable function on the hardware device; generating a device identifier from the two or more device keys; obtaining a device certificate from the hardware device; performing a verification of the device identifier; and providing a result of the device identifier verification.

One particular example implementation may include means for receiving two or more device keys from a physically unclonable function (PUF) on the hardware device; means for generating a device identifier from the two or more device keys; means for generating a digital signature based on the device identifier and a private key; means for creating a device certificate based on the device identifier and the digital signature; and means for storing the device certificate in a memory element. The implementation may also include the physically unclonable function being configured on the hardware device to generate the two or more device keys, where the keys uniquely identify the hardware device. Additionally, in the implementation, the memory element may be a non-volatile memory element included in the hardware device with the physically unclonable function. Also in the implementation, the two or more device keys may include between 500-5000 keys. The implementation may further comprise means for querying the physically unclonable function on the hardware device for each of the two or more device keys. Additionally, the means for generating the device identifier includes means for applying a cryptographic hash algorithm to the two or more keys.

Another particular example implementation may include means for receiving two or more device keys from a physically unclonable function (PUF) on the hardware device; means for generating a device identifier from the two or more device keys; means for obtaining a device certificate from the hardware device; means for performing a verification of the device identifier; and means for providing a result of the device identifier verification. In the implementation, the hardware device may be rejected if the result indicates the device identifier verification failed. The means for generating the device identifier may include applying a cryptographic hash algorithm to the two or more keys. The means for performing the device identifier verification may include comparing the device identifier to a previously generated device identifier. In the implementation, if the device identifier and the previously generated device identifier do not match, the result may indicate that the device identifier verification failed. Additionally, the implementation may include means for performing a verification of a digital signature in the device certificate; and means for providing a result of the digital signature verification. In the implementation, the hardware device may be rejected if the result indicates the digital signature verification failed. The means for performing the digital signature verification may include using a public key of a key pair to decrypt the digital signature. The implementation may further include querying the physically unclonable function on the hardware device for each of the two or more device keys.

What is claimed is:

1. At least one non-transitory machine accessible storage medium having instructions stored thereon for certifying a hardware device, the instructions when executed by a processor cause the processor to:
   query a physically unclonable function (PUF) based key generation system on the hardware device for two or more device keys;
   receive, by an enrollment host, the two or more device keys generated by the PUF based key generation system on the hardware device, wherein at least one device key of the two or more device keys is derived from a PUF root key by applying a cryptographic key derivation function;
   generate, by the enrollment host, a device identifier by applying a cryptographic hash algorithm to the two or more device keys;
   generate a digital signature based on the device identifier and a private key;
   create a device certificate based on the device identifier and the digital signature; and
   store the device certificate in a memory element of the hardware device.

2. The at least one non-transitory machine accessible storage medium of claim 1, wherein the keys uniquely identify the hardware device.

3. The at least one non-transitory machine accessible storage medium of claim 1, wherein the memory element is a non-volatile memory element included in the hardware device with the PUF based key generation system.

4. The at least one non-transitory machine accessible storage medium of claim 1, wherein the two or more device keys include between 500-5000 keys.

5. The at least one non-transitory machine accessible storage medium of claim 1, wherein the PUF based key generation system is to receive queries for the two or more device keys, and wherein another separate physical PUF based key generation system on the hardware device cannot be queried from an external device.

6. An apparatus for certifying a hardware device, the apparatus comprising:
   a processor; and
   an enrollment module executing on the processor, the enrollment module configured to:
   query a physically unclonable function (PUF) based key generation system on the hardware device for two or more device keys;
   receive the two or more device keys from the PUF based key generation system on the hardware device, wherein at least one device key of the two or more device keys is derived from a PUF root key by applying a cryptographic key derivation function;
   generate a device identifier by applying a cryptographic hash algorithm to the two or more device keys;
   generate a digital signature based on the device identifier and a private key;
   create a device certificate based on the device identifier and the digital signature; and
   store the device certificate in a memory element of the hardware device.

7. The apparatus of claim 6, wherein the keys uniquely identify the hardware device.

8. The apparatus of claim 6, wherein the memory element is a non-volatile memory element included in the hardware device with the PUF based key generation system.

9. The apparatus of claim 6, wherein the two or more device keys include between 500-5000 keys.

10. At least one machine accessible storage medium having instructions stored thereon for authenticating a hardware device, the instructions when executed by a processor cause the processor to:
    query a physically unclonable function (PUF) based key generation system on the hardware device for two or more device keys;
    receive, by an evaluation host, the two or more device keys from generated by the PUF based key generation system on the hardware device, wherein at least one device key of the two or more device keys is derived from a PUF root key by applying a cryptographic key derivation function;
    generate, by the evaluation host, a device identifier by applying a cryptographic hash algorithm to the two or more device keys;
    obtain a device certificate from the hardware device;
    perform a verification of the device identifier; and
    provide a result of the device identifier verification.

11. The at least one non-transitory machine accessible storage medium of claim 10, wherein the hardware device is rejected if the result indicates the device identifier verification failed.

12. The at least one non-transitory machine accessible storage medium of claim 10, comprising further instructions that when executed by the processor cause the processor to:
    compare the device identifier to a previously generated device identifier to perform the device identifier verification.

13. The at least one non-transitory machine accessible storage medium of claim 12, wherein, if the device identifier and the previously generated device identifier do not match, the result indicates that the device identifier verification failed.

14. The at least one non-transitory machine readable storage medium of claim 10, comprising further instructions that when executed by the processor cause the processor to:
perform a verification of a digital signature in the device certificate; and
provide a result of the digital signature verification.

15. The at least one non-transitory machine accessible storage medium of claim 14, wherein the hardware device is rejected if the result indicates the digital signature verification failed.

16. The at least one non-transitory machine accessible storage medium of claim 14, comprising further instructions that when executed by the processor cause the processor to:
use a public key of a key pair to decrypt the digital signature to perform the digital signature verification.

17. The at least one non-transitory machine accessible storage medium of claim 10, wherein the PUF based key generation system is to receive queries for the two or more device keys, and wherein another separate physical PUF based key generation system on the hardware device cannot be queried from an external device.

18. An apparatus for authenticating a hardware device, the apparatus comprising:
a processor; and
an evaluation module executing on the processor, the evaluation module configured to:
query a physically unclonable function (PUF) based key generation system on the hardware device for two or more device keys;
receive the two or more device keys from the PUF based key generation system on the hardware device, wherein at least one device key of the two or more device keys is derived from a PUF root key by applying a cryptographic key derivation function;
generate a device identifier by applying a cryptographic hash algorithm to the two or more device keys;
obtain a device certificate from the hardware device;
perform a verification of the device identifier; and
provide a result of the device identifier verification.

19. The apparatus of claim 18, wherein the hardware device is rejected if the result indicates the device identifier verification failed.

20. The apparatus of claim 18, wherein the evaluation module is further configured to:
compare the device identifier to a previously generated device identifier to perform the device identifier verification.

21. The apparatus of claim 20, wherein, if the device identifier and the previously generated device identifier do not match, the result indicates that the device identifier verification failed.

22. The apparatus of claim 18, wherein the evaluation module is further configured to:
perform a verification of a digital signature in the device certificate; and
provide a result of the digital signature verification.

23. The apparatus of claim 22, wherein the hardware device is rejected if the result indicates the digital signature verification failed.

24. The apparatus of claim 22, wherein the evaluation module is further configured to:
use a public key of a key pair to decrypt the digital signature to perform the digital signature verification.

* * * * *

UNITED STATES PATENT AND TRADEMARK OFFICE
CERTIFICATE OF CORRECTION

Page 1 of 1

PATENT NO. : 8,938,792 B2
APPLICATION NO. : 13/730469
DATED : January 20, 2015
INVENTOR(S) : Patrick Koeberl et al.

It is certified that error appears in the above-identified patent and that said Letters Patent is hereby corrected as shown below:

In the Claims

In column 18, line 42, in Claim 10, delete the word "from".

Signed and Sealed this
Twelfth Day of May, 2015

Michelle K. Lee
*Director of the United States Patent and Trademark Office*